United States Patent [19]

Kaminaga et al.

[11] Patent Number: 5,343,334
[45] Date of Patent: Aug. 30, 1994

[54] VIDEO TAPE THAT RECORDS, PLAYS BACK, AND RERECORDS VIDEO SIGNALS TO OVERCOME DROPOUTS

[75] Inventors: Kozo Kaminaga; Kazuo Ike; Tetsuro Makise; Yoshio Fujiwara; Kiyoshi Yamakawa; Kiyoshi Sawakata, all of Kanagawa, Japan

[73] Assignee: Sony Corporation, Tokyo, Japan

[21] Appl. No.: 660,008

[22] Filed: Feb. 25, 1991

[30] Foreign Application Priority Data

Feb. 28, 1990 [JP] Japan .................... 2-47524
Feb. 28, 1990 [JP] Japan .................... 2-47525
Feb. 28, 1990 [JP] Japan .................... 2-47526

[51] Int. Cl.⁵ ............................. H04N 5/78
[52] U.S. Cl. .................. 360/38.1; 360/77.16; 360/31; 360/53
[58] Field of Search ............... 360/24, 33.1, 38.1, 360/13, 55, 64, 7, 77.16, 107, 31, 53; 358/335, 336, 314, 310

[56] References Cited

U.S. PATENT DOCUMENTS

| | | | |
|---|---|---|---|
| 4,829,388 | 5/1989 | Nakayama et al. | 360/38.1 X |
| 5,012,355 | 4/1991 | Taga et al. | 360/64 X |
| 5,034,823 | 7/1991 | Geerlings | 360/38.1 X |
| 5,105,282 | 4/1992 | Taguchi | 360/38.1 X |

*Primary Examiner*—Andrew L. Sniezek
*Attorney, Agent, or Firm*—Lewis H. Eslinger; Jay H. Maioli

[57] ABSTRACT

In a video tape recorder, recording and reproducing heads record and reproduce a recording signal on recording tracks which are diagonally formed one after another on a tape-like recording medium. The recording heads are capable of recording again the same recording signal in the same recording region. If a recording error occurs during recording mode, information on where the recording error has occurred and a recording signal to be recorded are stored in a memory. During rerecording mode, the stored information is used to complement the recording error. If a recording error occurs, preliminary recording circuitry operates so as to complement this recording error. The above construction permits the recording signal to be recorded on the recording tracks with certainty.

2 Claims, 9 Drawing Sheets

VIDEO TAPE THAT RECORDS, PLAYS BACK, AND RERECORDS VIDEO SIGNALS TO OVERCOME DROPOUTS

BACKGROUND OF THE INVENTION

1. Field of the Invention

The present invention relates to a video tape recorder (VTR) and, more particularly, to a video tape recorder (VTR) which is suitable for recording a digital image signal and a digital audio signal on a magnetic tape.

2. Description of the Related Art

In some conventional digital video tape recorders (digital VTRs) which record and reproduce a digital image signal, as shown, for example, in FIG. 1, a recording signal $S_{REC}$ is sequentially recorded with the aid of a recording head 4A on a magnetic tape 1 that runs in the direction indicated by arrow K1. This recording signal $S_{REC}$ is sent from a recording circuit 3, and is composed of a digital image signal and a digital audio signal. A reproducing signal $S_{PB}$ which is read with the aid of a reproducing head 5A arranged downstream of the magnetic tape 1 is reproduced by a reproducing circuit 6 immediately after the recording signal $S_{REC}$ has been recorded. The digital signal can thus be monitored to determine whether or not it has been recorded correctly.

A VTR has been proposed (refer to Japanese Unexamined Publication No. 56-156975) in which, during reproduction, a reproduced signal is first stored, and a pre-existing signal recorded on a magnetic tape is deleted. The reproduced signal which has been recorded is then written once again.

As shown in FIG. 2, tracks TR1, TR2 . . . are sequentially arranged on the magnetic tape 1 to be apart from each other at a distance equal to a track pitch TP. The six tracks TR1-TR6 out of the above plurality of tracks are regarded as being one set. The digital image signal and the digital audio signal equal to the amount of one field are divided into and recorded on the six tracks TR1-TR6.

Each of the six tracks TR1-TR6 is divided into a region ARV (called an image region) in which the digital image signal is recorded and a region ARA (called an audio region) in which the digital audio signal is recorded.

As illustrated in FIG. 3, the image region ARV is subdivided into k recording regions (called sync blocks) SBV1-SBVk. A synchronization pattern, an ID pattern, a data block and error controlling data are recorded in each sync block.

Furthermore, as shown in FIG. 4, the audio region ARA is divided into four channel regions ARA1-ARA4. Each channel region is further subdivided into n sink blocks SBAt1-SBAtn (t=1, 2, 3 and 4) in the same manner as in the image region ARV. The data of a 4-channel digital audio signal is assigned to and recorded in each channel region.

A rotary drum 7 having the construction shown in FIG. 5 is used in a digital VTR in which the digital image signal and the digital audio signal, utilizing the formats mentioned above, are recorded and reproduced on the magnetic tape 1.

That is, the rotary drum 7 has the magnetic tape 1 wound around the periphery 7A of the rotary drum 7 by guide posts 8A and 8B. The magnetic tape 1 runs in the direction indicated by arrow K1, whereas the rotary drum 7 rotates in the direction indicated by arrow K2.

The rotary drum 7 is provided with a total of four recording/reproducing systems which are all similar to a first recording/reproducing system. This first recording/reproducing system is composed of the recording head 4A and the reproducing head 5A, both of which were previously described with reference to FIG. 1.

In other words, the first recording/reproducing system (see FIG. 1) is constructed in such a way that the recording head 4A, for scanning the track TR1 (see FIG. 2), is arranged on the periphery 7A of the rotary drum 7. The reproducing head 5A, for reproducing and scanning the track TR1 after the recording head 4A has scanned, is also disposed in the direction opposite to that in which the rotary drum 7 rotates, 90° apart from the recording head 4A.

A recording head 4B and a reproducing head 5B, both of which are used for sequentially scanning the track TR2 and which act as a second recording/reproducing system, are disposed apart from the recording head 4A and the reproducing head 5A, respectively, at a distance equal to only the track pitch TP.

A recording head 4C and a reproducing head 5C, both of which serve as a third recording/reproducing system and are used for sequentially scanning the track TR3, are further arranged 180° apart from the recording head 4A and the reproducing head 5A, respectively. Also, a recording head 4D and a reproducing head 5D, both of which are used for sequentially scanning the track TR4 and which serve as a fourth recording/reproducing system, are disposed apart from the recording head 4C and the reproducing head 5C at a distance equal to only the track pitch TP.

The rotary drum 7 thus has four recording/reproducing systems. While the rotary drum 7 rotates a half turn, the recording heads 4A and 4B record and scan the tracks TR1 and TR2. Thereafter, while the rotary drum 7 rotates another half turn, the recording heads 4C and 4D record and scan the tracks TR3 and TR4. While the rotary drum 7 further rotates a half turn, the recording heads 4A and 4B record and scan the tracks TR5 and TR6.

Thus, every time the rotary drum 7 rotates one and a half turns, the digital image signal and the digital audio signal equal to the amount of one field are sequentially recorded on the tracks TR1-TR6.

On the other hand, the reproducing heads 5A and 5B follow and scan the tracks TR1 and TR2 which have been scanned by the recording heads 4A and 4B. These reproducing heads 5A and 5B reproduce and monitor the recording signal which has been recorded by the recording heads 4A and 4B immediately after the recording heads 4A and 4B have recorded the recording signal. Similarly, the reproducing heads 5C and 5D follow and scan the tracks TR3 and TR4 which have been scanned by the recording heads 4C and 4D. The reproducing heads 5C and 5D reproduce and monitor the recording signal which has been recorded by the recording heads 4C and 4D immediately after the recording heads 4C and 4D have recorded the recording signal.

Thus, the recording heads 4A-4D sequentially record the digital image signal and the digital audio signal on the tracks TR1-TR6 of the magnetic tape 1. The reproducing heads 5A-5D subsequently detect whether or not the digital image and digital audio signals are recorded correctly.

In the thus-constructed digital VTR, the recording heads 4A-4D scan the magnetic tape 1 while slidably coming in contact with the surface of the magnetic tape 1. In such an arrangement, a foreign substance such as dust may get caught in the gaps (head gaps) between the magnetic tape 1 and the recording heads 4A-4D. This results in a problem in that what is called a dropout occurs in which the recorded data is partially missing. A foreign substance such as dust may also get caught in the head gaps, thus leading to a problem in that what is known a clog occurs in which the recorded data is continuously missing. Such problems deteriorate the reproduced image and sound.

SUMMARY OF THE INVENTION

The present invention has been made in view of the above problems. The object of the invention is to provide a video tape recorder in which it is possible to prevent the recorded data from being lost and to prevent the reproduced image and sound from deteriorating.

In order to solve the above problems, the present invention provides a video tape recorder 10 in which a recording signal $S_{REC}$ is recorded on recording tracks which are formed diagonally one after another on a recording medium 1 to be scanned in a predetermined direction, wherein after first recording heads 12A, 12B, 12C and 12D underwrite and record the recording signal $S_{REC}$ on the predetermined recording tracks of the recording medium, second recording heads 4A, 4B, 4C and 4D superimpose and record the recording signal $S_{REC}$ on the predetermined recording tracks.

The first recording heads 12A, 12B, 12C and 12D as well as the second recording heads 4A, 4B, 4C and 4D superimpose and record the same recording signal $S_{REC}$ in the same recording region. Therefore, even if the first recording heads 12A, 12B, 12C and 12D do not record the recording signal $S_{REC}$ because of a clog or the like, the second recording heads will record the data, and likewise, even if the second recording heads 4A, 4B, 4C and 4D do not record the recording signal $S_{REC}$, the first recording heads will record the data. It is thus possible to markedly reduce the ratio at which recording errors occur.

Furthermore, in order to solve the above problems, the invention provides a video tape recorder wherein in a first recording mode, in which a predetermined-recording signal $S_{REC}$ is re-recorded on a recording medium 1 position information about a recording region in which a recording error has occurred and a correct recording signal $S_{REC}$ to be recorded in the recording region, are stored by predetermined storing means 48A and 45, and wherein after the first recording mode has been completed, a rerecording mode is executed in which the recording signal $S_{REC}$ which is read by the storing means 45, is supplementarily re-recorded in the recording region in which the recording error has occurred.

In the first recording mode, the position information about the recording region in which the recording error has occurred and the correct recording signal to be recorded in this recording region, are stored in the storing means 48A and 45. After the first recording mode has been completed, the re-recording mode is executed in order to record the recording signal which has been stored in the storing means 45. The recording region in which the recording error has occurred can thus be complemented.

In addition, in order to solve the above problems, the present invention provides video tape recorders 10 and 40, in which a predetermined recording signal $S_{REC}$ is recorded on recording tracks which are formed diagonally one after another on a recording medium 1, these video tape recorders comprising: first recording means 4A, 4B, 4C and 4D for recording the recording signal on the recording tracks; reproducing means 5A, 5B, 5C and 5D for reading the recording signal $S_{REC}$ from the recording tracks on which the recording signal has been recorded by the first recording means 4A, 4B, 4C and 4D; recording error detecting means 60 and 68 for detecting whether or not a recording error occurs at the recording signal $S_{REC}$ which has been read by the reproducing means 5A, 5B, 5C and 5D; and second recording means 58A, 58B, 58C, 58D, 69A, 69B, and 69D for re-recording the recording signal $S_{REC}$ over the signal recorded by the first recording means 4A, 4B, 4C and 4D, if the recording error detecting means 60 and 68 detect a recording error.

Even if the first recording means 4A, 4B, 4C and 4D do not record the recording signal $S_{REC}$, the second recording means 58A, 58B, 58C, 58D, 69A, 69B, 69C, and 64D record the the recording signal $S_{REC}$ instead of the first recording means, thereby leaving no region of a recording error on the recording medium 1.

DESCRIPTION OF THE PREFERRED EMBODIMENTS

A first embodiment of the present invention will be described below with reference to the drawings.

(1) First Embodiment

Figure 1:
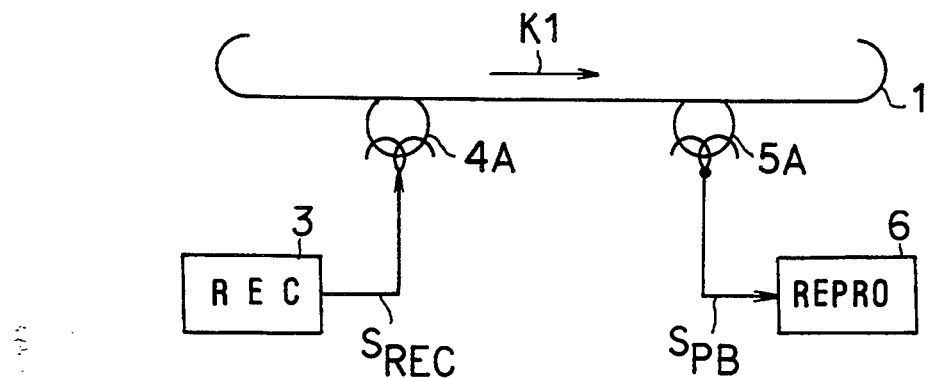
FIG. 1 is a block diagram showing the conventional art.
Figure 6:
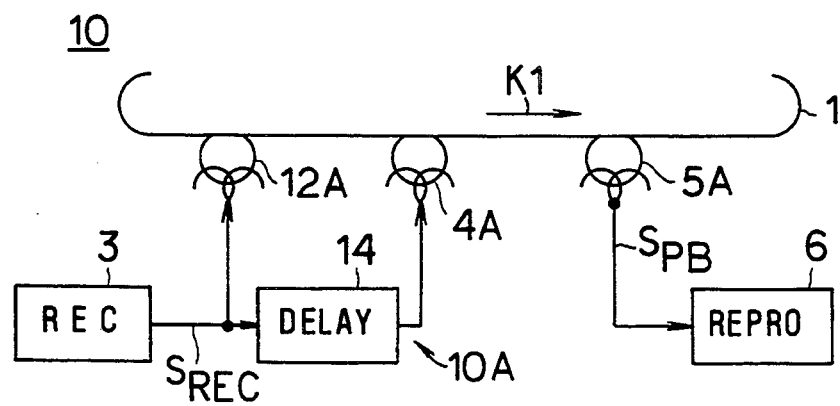
FIG. 6 is a block diagram illustrating a first embodiment of a video tape recorder in accordance with the present invention.

Components corresponding to those in FIG. 1 are denoted by the same reference characters in FIG. 6. In FIG. 6, a first recording system 10A of a video tape recorder 10 records a recording signal $S_{REC}$ composed of a digital image signal and a digital audio signal. This recording is made with the aid of a recording head 4A and a recording head 12A, which is used for underwriting a magnetic tape 1 which runs in the direction indicated by arrow K1.

More specifically, a recording circuit 3 sends the recording signal $S_{REC}$ to the recording head 12A for underwriting so as to underwrite this recording signal $S_{REC}$ on a track TR1 of the magnetic tape 1. At the same time, the recording circuit 3 sends the recording signal $S_{REC}$ to a delay circuit 14.

The delay circuit 14 delays the recording signal $SRE_C$ for an amount of time which corresponds to the speed at which the magnetic tape 1 runs and the space between the recording head 4A and the recording head 12A for underwriting. The delay circuit 14 then sends the recording signal $S_{REC}$ to the recording head 4A. This sending allows the recording head 4A to overwrite the recording signal $S_{REC}$ on the track TR1 at such a time that the track TR1 on which the same recording signal $S_{REC}$ has been underwritten by the recording head 12A (for underwriting) approaches the recording head 4A.

Figure 7:
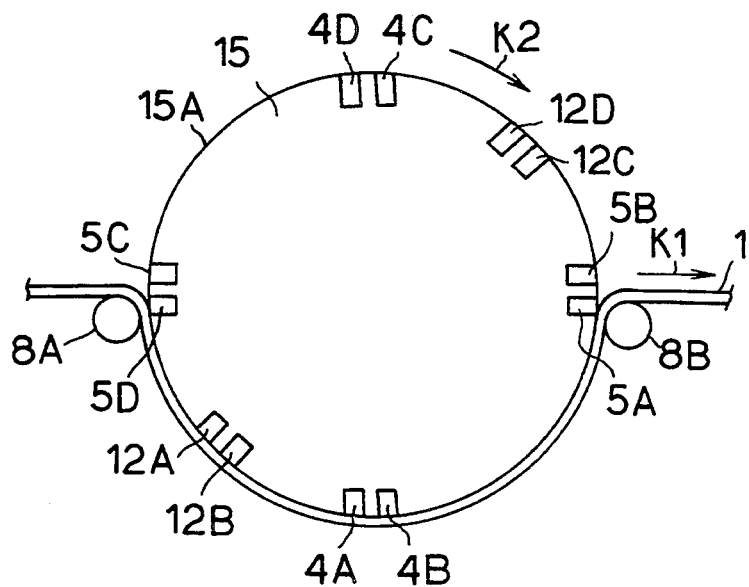
FIG. 7 is a schematic diagram showing the structure of a rotary drum of FIG. 7 of the first embodiment.

In this embodiment, a rotary drum 15 shown in FIG. 7 is used as a method of overwriting the recording signal $S_{REC}$ in the above manner.

The magnetic tape 1 is helically wound by guide posts 8A and 8B around the periphery 15A of the rotary drum 15. The magnetic tape 1 runs in the direction indicated by arrow K1, whereas the rotary drum 15 is rotated in the direction indicated by arrow K2.

The rotary drum 15 is provided with a total of four recording systems which are all similar to the first recording system 10A. As described above with reference to FIG. 6, this first recording system 10A is composed of the recording head 4A and the recording head 12A for underwriting.

Figure 2:
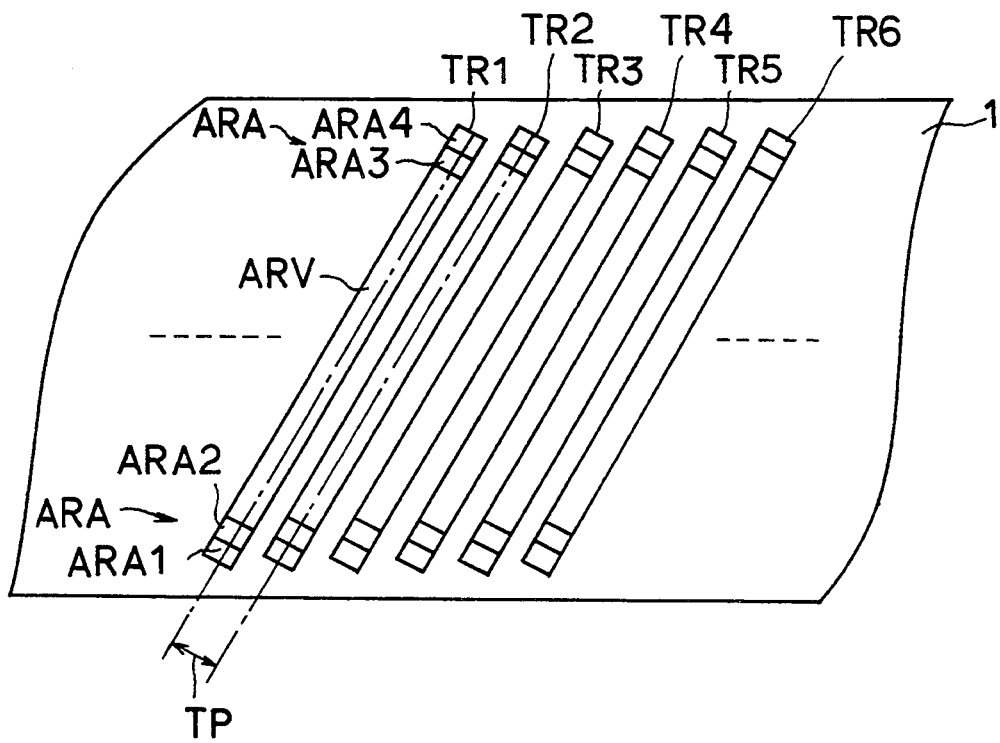
FIGS. 2 to 4 are plan views showing formats on a magnetic tape.
Figure 3:
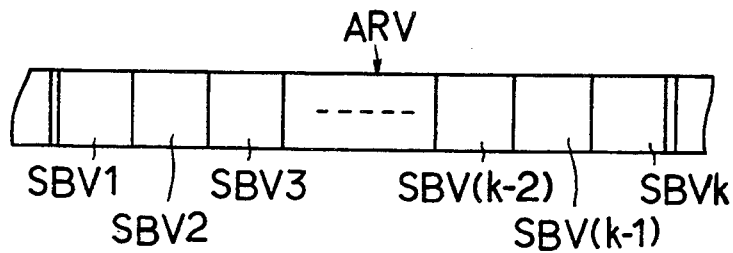
Figure 4:
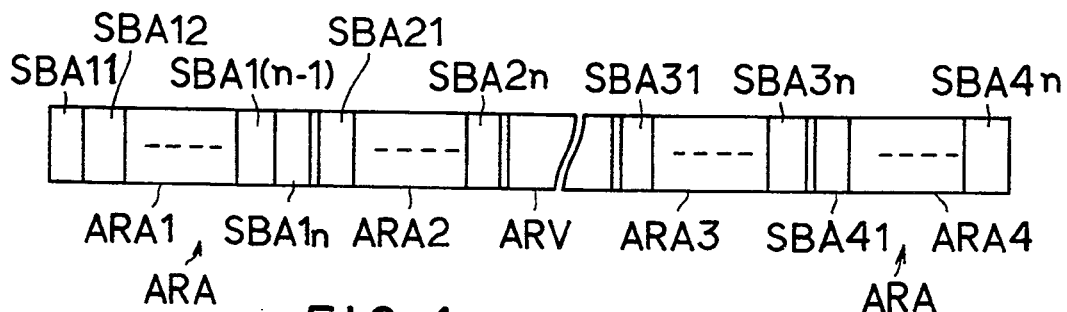

In other words, the first recording system 10A (see FIG. 6) is constructed in such a way that the recording head 4A and the recording head 12A (for underwriting), which is apart from the recording head 4A by a predetermined angle in a direction in which the rotary drum 15 rotates, are arranged on the periphery 15A of the rotary drum 15. The recording head 4A is used for scanning the track TR1 (see FIG. 2), whereas the recording head 12A for underwriting is used for recording/scanning the track TR1 before the recording head 4A scans the track TR1.

A recording head 4B and a recording head 12B for underwriting, both of which are used for sequentially scanning a track TR2 and act as a second recording system, are also disposed apart from the recording head 4A and the recording head 12A for underwriting at a distance equal to track pitch TP.

A recording head 4C and a recording head 12C for underwriting, both of which serve as a third recording system and are used for sequentially scanning a track TR3, are further arranged 180° apart from the recording head 4A and the underwriting head 12A, respectively. Also, a recording head 4D and a recording head 12D for underwriting, both of which are used for sequentially scanning a track TR4 and serve as a fourth recording system, are disposed apart from the recording head 4C and the recording head 12C for underwriting at a distance equal to the track pitch TP.

The four recording systems are thus arranged on the rotary drum 15. The recording heads 12A-12D (for underwriting) and the recording heads 4A-4D write the recording signal $S_{REC}$ on all the tracks TR1, TR2 . . . TR6 as rotary drum 15 rotates.

Reproducing heads 5A and 5B are arranged in a direction opposite to the direction in which the rotary drum 15 rotates, 90° apart from the recording heads 4A and 4B. Reproducing heads 5C and 5D are also arranged in the direction opposite to that in which the rotary drum 15 rotates. These reproducing heads 5A and 5B monitor/reproduce the recording signal which is recorded by the recording heads 4A and 4B. The reproducing heads 5C and 5D monitor/reproduce the recording signal which is recorded by the recording heads 4C and 4D.

Figure 8:
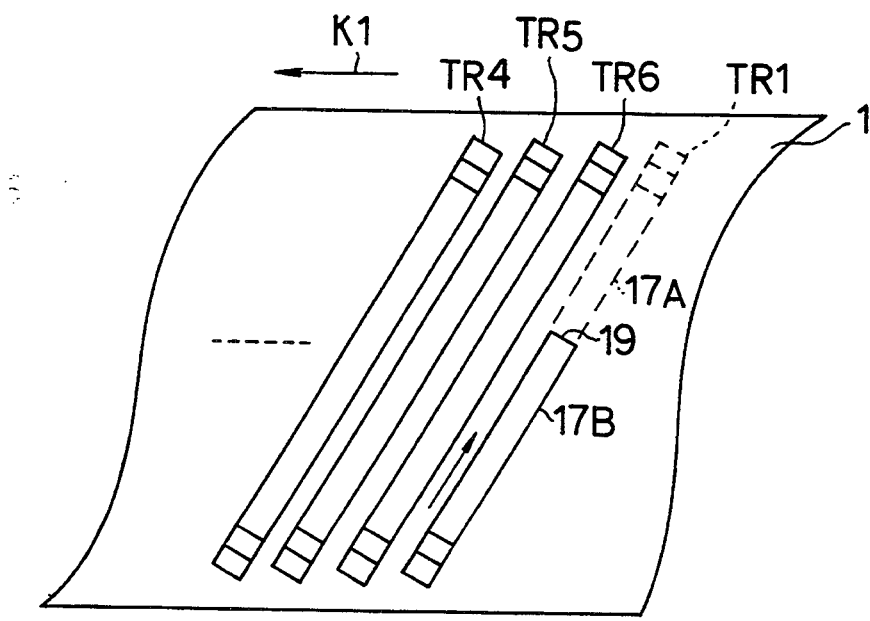
FIGS. 8 and 9 are schematic plan views used for explaining the operation of the rotary drum.

In the above construction, as shown in FIG. 8, for example, even if the recording signal $S_{REC}$ may not be recorded because a foreign substance such as dust is caught at a head gap while the recording head 4A is scanning the track TR1, recorded data is generated in a substantially successive manner in regions 17A and 17B of the track TR1 which are recorded by the recording head 12A (for underwriting) and the recording head 4A, respectively. This is because the recording signal $S_{REC}$ is previously underwritten on the track TR1 by the recording head 12A for underwriting.

Figure 9:
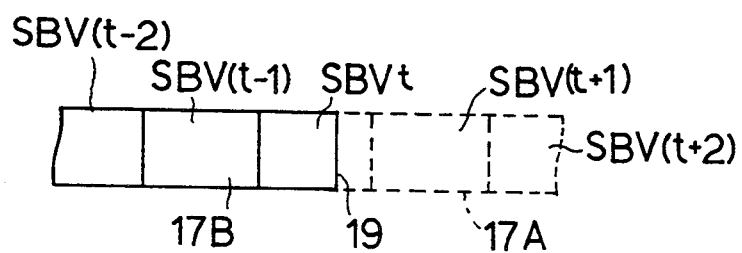

As shown in FIG. 9, in such a case where, while the recording head 4A is scanning, e.g., a sink block SBVt, a clog occurs preventing the recording signal $S_{REC}$ from being recorded, then a boundary portion 19 is formed in the sink block SBVt between the region 17B, recorded by the recording head 4A, and the region 17A, recorded by the recording head 12A for underwriting.

At this stage, the recording signal $S_{REC}$ is correctly recorded in sync blocks SBV (t+1), SBV (t+2) . . . by means of the recording head 12A for underwriting. At the same time, the recording signal $S_{REC}$ is correctly recorded in sync blocks SBV (t−1), SBV (t−2) . . . by means of the recording head 4A.

Thus, even if the recording head 4A will not record the recording signal $S_{REC}$ because of a clog or the like, the sync block SBVt is the only region in which the recorded data is not recorded correctly since it is not generated successively. During reproduction, therefore, an error correction means such as a dropout compensation is utilized to correct this recorded data in only the sync block SBVt. It is thus possible to prevent a reproduced image from deteriorating within a sufficient range for practical use.

Even if the recording heads 4A-4D will not record the recording signal $S_{REC}$ because of a clog or the like, it is possible to prevent, in all the tracks TR1, TR2 . . . , continuous lack of the recorded data which may deteriorate the reproduced image, so long as the recording heads 12A-12D (for underwriting) record the recording signal $S_{REC}$ correctly. This is because the recording heads 12A-12D (for underwriting) have previously recorded the same recording signal $S_{REC}$.

On the other hand, if a clog or the like occurs on the recording heads 12A-12D (for underwriting), thus preventing these heads 12A-12D from underwriting the recording signal $S_{REC}$ correctly, the same recording signal $S_{REC}$ is correctly recorded by the recording heads 4A-4D, so long as these recording heads 4A-4D record the recording signal $S_{REC}$ correctly.

It is thus possible to prevent the reproduced image from deteriorating by reproducing the recorded data in which the recording signal $S_{REC}$ is recorded.

The ratio P1 at which one recording head cannot perform recording because of a clog or the like is expressed by the following equation.

$$P1 = 2^{-6} \quad (1)$$

From the above equation, if the same recording signal is "over-recorded" by the recording heads for underwriting as well as the recording heads, the ratio P2 at which the recording signal is recorded neither by the recording heads for underwriting nor by the recording heads is given by the be low equation.

$$P2 = 2^{-6} \times 2^{-6} = 2^{-12} \quad (2)$$

Thus, the ratio at which recording errors caused by a clog or the like occur can be remarkably reduced.

The construction thus described assists in avoiding recording errors which may deteriorate the reproduced image, even if a clog or the like occurs on the recording heads 4A-4D or the recording heads 12A-12D for underwriting. This is because the recording heads 4A-4D overwrite the recording signal $S_{REC}$ in the region in which the recording heads 12A-12D (for underwriting) have already underwritten the same recording signal $S_{REC}$.

(2) A Modification of the First Embodiment

Figure 10:
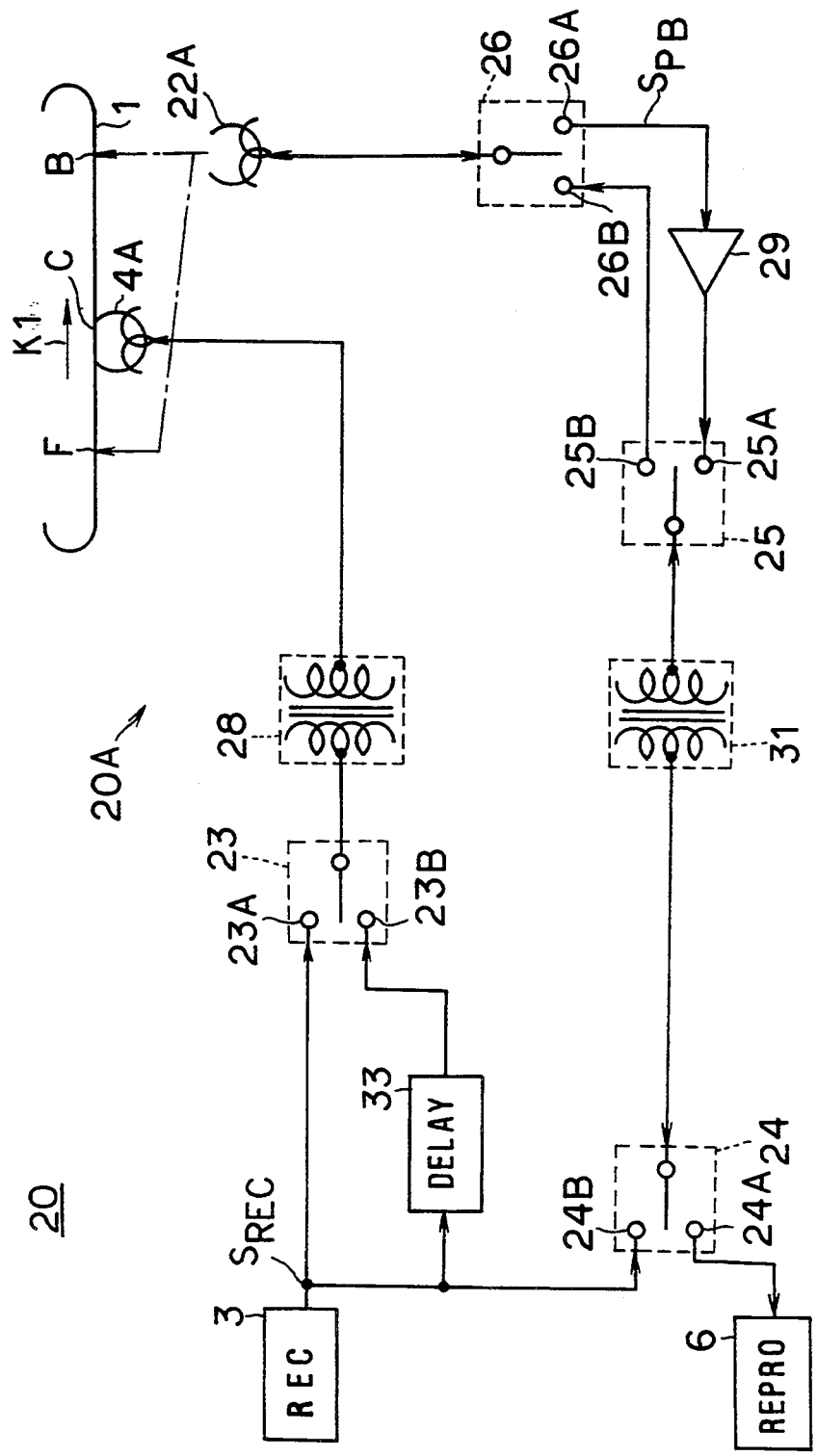
FIG. 10 is a block diagram showing a modification of the first embodiment of the video tape recorder according to the invention.

Components corresponding to those in FIG. 6 are denoted by the same reference characters in FIG. 10. In FIG. 10, a recording head 4A and recording/reproducing head 22A of a first recording/reproducing system 20A of a video tape recorder 20 scan a magnetic tape 1 which runs in the direction indicated by arrow K1.

The recording head 4A is composed of a wide head gap, and is designed to magnetize the magnetic tape 1 as deep as possible in its thickness direction when recording a recording signal $S_{REC}$ on the magnetic tape 1.

On the other hand, the recording/reproducing head 22A is composed of a narrow head gap. This narrow head gap makes it possible to reproduce magnetic flux in the thinnest possible portion of the magnetic tape 1 when reading the recording signal recorded on the magnetic tape 1, whereby high-frequency components can be reproduced.

During normal recording mode, in which recorded data generated by recording the recording signal $S_{REC}$ is monitored/reproduced immediately after the recorded data has been generated, the recording/reproducing head 22A scans the magnetic tape 1 in scanning position B. Thus, the recording/reproducing head 22A reproduces and scans a track which has been recorded and scanned by the recording head 4A so as to monitor whether or not the recording signal $S_{REC}$ is correctly recorded.

On the other hand, in overwrite recording mode, in which the same recording signal $S_{REC}$ is "over-recorded" on the same track, the recording/reproducing head 22A is controllably moved to scanning position F in order to scan the magnetic tape 1. Thus, the recording head 4A overwrites the same recording signal $S_{REC}$ on a track which has been recorded and scanned by the recording/reproducing head 22A.

In other words, in the normal recording mode, a switching circuit 23 is switched over to a switch input terminal 23A. While at the same time, switching circuits 24, 25 and 26 are switched over to their respective terminals 24A, 25A and 26A. The recording signal $S_{REC}$, which is composed of a digital image signal and a digital audio signal, is sent from a recording circuit 3 and is fed to the recording head 4A via the switching circuit 23 and a rotary transformer 28. As a result, recorded data based on the recording signal $S_{REC}$ is recorded on the recording surface of the magnetic tape 1.

At this stage, the recording/reproducing head 22A reads, in scanning position B, the recorded data which has been recorded by the recording head 4A, while the recording/reproducing head 22A is reproducing and scanning a track which has been recorded and scanned by the recording head 4A immediately after the recording head 4A has scanned this track. The recording/reproducing head 22A then sends a reproducing signal $S_{PB}$ to a amplifying circuit 29 (for reproduction) through a switching circuit 26 in order to amplify this reproducing signal $S_{PB}$ to a predetermined signal level. Thereafter, the reproducing signal $S_{PB}$ is sent to a reproducing circuit 6 through a switching circuit 25, a rotary transformer 31 and a switching circuit 24 so as to reproduce the reproducing signal $S_{PB}$. By reproducing the reproducing signal $S_{PB}$, it is possible to monitor whether or not the recording signal $S_{REC}$ recorded by the recording head 4A is correctly recorded.

On the other hand, in the overwrite recording mode, the switching circuit 23 is switched over to a switch input terminal 23B. While at the same time, the switching circuits 24, 25 and 26 are also switched over to their respective terminals 24B, 25B and 26B.

At this phase, the recording/reproducing head 22A is controllably moved to scanning position F, thereby underwriting the recording signal $S_{REC}$ on the magnetic tape 1. This recording signal $S_{REC}$ is input via the switching circuit 24, the rotary transformer 31, and the switching circuits 25 and 26. At the same time, the recording head 4A overwrites the recording signal $S_{REC}$ on the magnetic tape 1, this recording signal $S_{REC}$ being input via a delay circuit 33, the switching circuit 23 and the rotary transformer 28.

A delay time generated by the delay circuit 33 is set based on the speed at which the magnetic tape 1 runs and the space between scanning position F of the recording/reproducing head 22A and scanning position C of the recording head 4A. The recording signal $S_{REC}$ is overwritten on a track TR1 with the aid of the recording head 4A at such a time that the track TR1, on which the recording signal $S_{REC}$ has been underwritten by the recording/reproducing head 22A in scanning position F, approaches scanning position C in which the recording head 4A scans the track TR1.

Thus, the recording signal $S_{REC}$ is first underwritten by the recording/reproducing head 22A and then overwritten by the recording head 4A on the track TR1 of the magnetic tape 1, in the same recording position.

Figure 11:
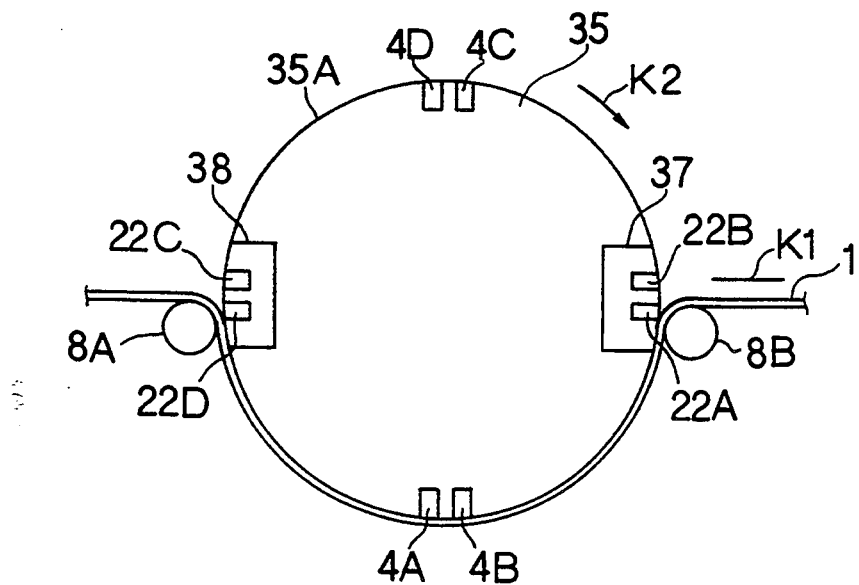
FIG. 11 is a schematic diagram showing the structure of a rotary drum of the modification.

In this embodiment, a rotary drum 35, having construction shown in FIG. 11, controllably moves the recording/reproducing head 22A, which is used for overwriting the recording signal $S_{REC}$ on the magnetic tape 1.

The magnetic tape 1, which runs in the direction indicated by arrow K1, is wound by guide posts 8A and 8B around a rotary drum 35. The rotary drum 35 is rotated in the direction indicated by arrow K2.

The rotary drum 35 is provided with a total of four recording/reproducing systems which are all similar to the recording/reproducing system 20A described with reference to FIG. 10.

The first recording/reproducing system 20A (see FIG. 10) is constructed in such a manner that the recording head 4A is arranged on the periphery 35A of the rotary drum 35. The recording/reproducing head 22A is arranged in a direction opposite to that in which the rotary drum 35 rotates, 90° apart from the recording head 4A. Both the recording head 4A and the recording/reproducing head 22A are used for scanning the track TR1 (see FIG. 2).

A recording head 4B and a recording/reproducing head 22B, both of which are used for scanning track TR2, are used as a second recording/reproducing system. They are disposed apart from the recording head 4A and the recording/reproducing head 22A, respectively at a distance equal to a track pitch TP.

A recording head 4C and a recording/reproducing head 22C, both of which are used as a third recording/reproducing system, are used for scanning a track TR3. These heads are further arranged 180° apart from the recording head 4A and the recording/reproducing head 22A, respectively. Also, a recording head 4D and a recording/reproducing head 22D, both of which are used for scanning a track TR4 and are used as a fourth recording/reproducing system. Head 4D and head 22D are disposed apart from the recording head 4C and the recording/reproducing head 22C, respectively, at a distance equal to the track pitch TP.

In this embodiment, the recording/reproducing heads 22A and 22B are fixed to one end of a bimorph plate 37, whereas the recording/reproducing heads 22C and 22D are fixed to one end of a bimorph plate 38. The other ends of these bimorph plates 37 and 38 are fixed to the rotary drum 35. The bimorph plates 37 and 38 (formed of layered ceramic plates having piezoelectricity) are head drive mechanisms used for performing the dynamic tracking operation. Voltage being applied to the bimorph plates 37 and 38 can be controlled to move the recording/reproducing heads 22A-22D in a direction parallel with the pivot of the rotary drum 35.

Thus, during the normal recording mode, the recording/reproducing heads 22A-22D are controllably moved to such a position that they can respectively follow and scan the tracks which the recording heads 4A-4D have already scanned. The recording/reproducing heads 22A-22D are thereby caused to scan the magnetic tape 1 in scanning position B shown in FIG. 10.

In other words, during the normal recording mode, the recording heads 4A and 4B first record and scan the tracks TR1 and TR2, and then the recording/reproducing heads 22A and 22B follow these tracks TR1 and TR2 so as to scan them. Similarly, the recording heads 4C and 4D first record and scan the tracks TR3 and TR4, and then the recording/reproducing heads 22C and 22D follow these tracks TR3 and TR4 so as to scan them. The recording/reproducing heads 22A and 22B can thus monitor and reproduce recorded data which has been recorded by the recording head 4A and 4B. Likewise, the recording/reproducing heads 22C and 22D can thus monitor and reproduce recorded data which has been recorded by the recording head 4C and 4D.

On the other hand, during the overwrite recording mode, voltage being applied to the bimorph plates 37 and 38 can be controlled to move the recording/reproducing heads 22A-22D a predetermined distance in a direction parallel with the pivot of the rotary drum 35. The recording/reproducing heads 22A-22D are controllably moved to such a position that they can respectively scan the tracks which the recording heads 4A-4D are to scan, before the recording heads 4A-4D scan the tracks. The recording/reproducing heads 22A-22D are thereby caused to scan the magnetic tape 1 in scanning position F illustrated in FIG. 10.

That is, during the overwrite recording mode, the recording/reproducing heads 22A and 22B underwrite and monitor the tracks TR1 and TR2 which are to be recorded and scanned by the recording heads 4A and 4B before these recording heads 4A and 4B record and scan the tracks TR1 and TR2. Similarly, the recording/reproducing heads 22C and 22D underwrite and monitor the tracks TR3 and TR4 which are to be recorded and scanned by the recording heads 4C and 4D before these recording heads 4C and 4D record and scan the tracks TR3 and TR4. The recording/reproducing heads 22A-22D can thus underwrite the recording signal $S_{REC}$ on the tracks TR1, TR2 . . . before the recording heads 4A-4D write the same recording signal $S_{REC}$ on the same tracks TR1, TR2 . . . .

Thus, the recording/reproducing heads 22A-22D can be switched over to either the normal recording mode or the overwrite recording mode. This switching is performed by controllably moving the recording/reproducing heads 22A-22D to either scanning position B or scanning position F so as to serve as either monitoring/reproducing heads or underwriting heads.

In the above construction, during the overwrite mode, the recording/reproducing heads 22A-22D sequentially underwrite and scan the tracks TR1-TR4 in scanning position F (see FIG. 10). Subsequently, the recording heads 4A-4D sequentially overwrite and scan the tracks TR1-TR4, whereby the recording signals $S_{REC}$ respectively recorded by the recording/reproducing heads 22A-22D are overwritten.

In the same manner as in the case described with reference to FIG. 8, even if the recording signal $S_{REC}$ is not recorded due to a foreign substance such as dust which is caught in the head gap while the recording head 4A is scanning the track TR1, the recorded data can be recorded in a substantially successive manner in a region 17A by the recording/reproducing head 22A and in region 17B by the recording head 4A. This is because the recording/reproducing head 22A has already underwritten the recording signal $S_{REC}$.

Even if the recording signal $S_{REC}$ is not recorded, an error correction means such as a dropout compensation is utilized during reproduction to correct only this recorded data in the sync block SBVt (see FIG. 9). It is thus possible to prevent a reproduced image from deteriorating within a sufficient range for practical use. The sync block SBVt is where a boundary portion 19 is formed between the region 17B, recorded by the recording head 4A, and the region 17A, recorded by the recording/reproducing head 22A, whereby the recorded data is not generated successively.

Thus, even if the recording heads 4A-4D will not record the recording signal $S_{REC}$ because of a clog or the like, it is possible to prevent, in all the tracks TR1, TR2 . . . , a continuous lack of the recorded data which may deteriorate the reproduced image, so long as the recording/reproducing heads 22A-22D record the recording signal $S_{REC}$ correctly. This is because the recording/reproducing heads 22A-22D have previously recorded the same recording signal $S_{REC}$.

On the other hand, if a clog or the like occurs on the recording/reproducing heads 22A-22D, thus preventing these heads 22A-22D from underwriting the recording signal $SRE_C$ correctly, the recording signal $S_{REC}$ is correctly recorded by the recording heads 4A-4D, so long as these recording heads 4A-4D record the recording signal $S_{REC}$ correctly.

Thus, even if either the recording heads 4A-4D or the recording/reproducing heads 22A-22D do not correctly record the recording signal $S_{REC}$, the recording signal $S_{REC}$ can be accurately recorded to such a degree that it is only necessary to correct, during reproduction, the recorded data in the sync block SBVt at which the boundary portion 19 is formed.

That is, even if a recording error occurs either on the recording heads 4A-4D or on the recording/reproducing heads 22A-22D because of a clog or the like, the image can be reproduced within a sufficient range for practical use. It is thus possible to prevent successive lack of the recorded data, so long as a recording error occurs neither on the recording heads 4A-4D nor on the recording/reproducing heads 22A-22D at the same time.

It is thus possible to markedly reduce the ratio at which successive lack of the recorded data occurs.

The thus-described construction permits an appreciable reduction in the ratio at which successive lack of the recorded data occurs. Such lack may deteriorate the reproduced image. This reduction is made possible by virtue of the fact that the recording/reproducing heads 22A-22D underwrite the recording signal $S_{REC}$ before this recording signal $S_{REC}$ is recorded on the tracks by the recording heads 4A-4D.

Since a head which is used for monitoring and reproducing during the normal recording mode is used as the underwriting head, a separate underwriting head is not necessary. In a simple structure, the recording signal $S_{REC}$ can be overwritten.

(3) Other Modifications of the First Embodiment (3-1) In the above embodiments, although a digital image signal of one field is divided into six tracks for recording, the present invention is not limited to such recording. For example, a digital image signal of one field may also be recorded in only one track or a plurality of tracks other than six tracks.

(3-2) In the embodiments mentioned above, although the same recording signal is written twice, the frequency of writing is not limited to twice. The same recording signal may also be overwritten two or more times.

(3-3) In the previously mentioned embodiments, the invention is applied to a digital VTR which has a rotary drum composed of four recording/reproducing systems. The invention is not limited to such a VTR, but may also be applied to VTRs which have a rotary drum composed of a plurality of heads, or to magnetic recording devices which have stationary heads.

(3-4) Though the invention is applied to a digital VTR in the above-mentioned embodiments, it is not limited to such a digital VTR. The invention may also be widely applied to magnetic recording devices in which a recording signal is recorded on tracks of a magnetic tape, or to recording devices, such as magnetic disks and optical magnetic disks, in which a recording signal is recorded on a recording medium.

(4) Second Embodiment

Figure 12:
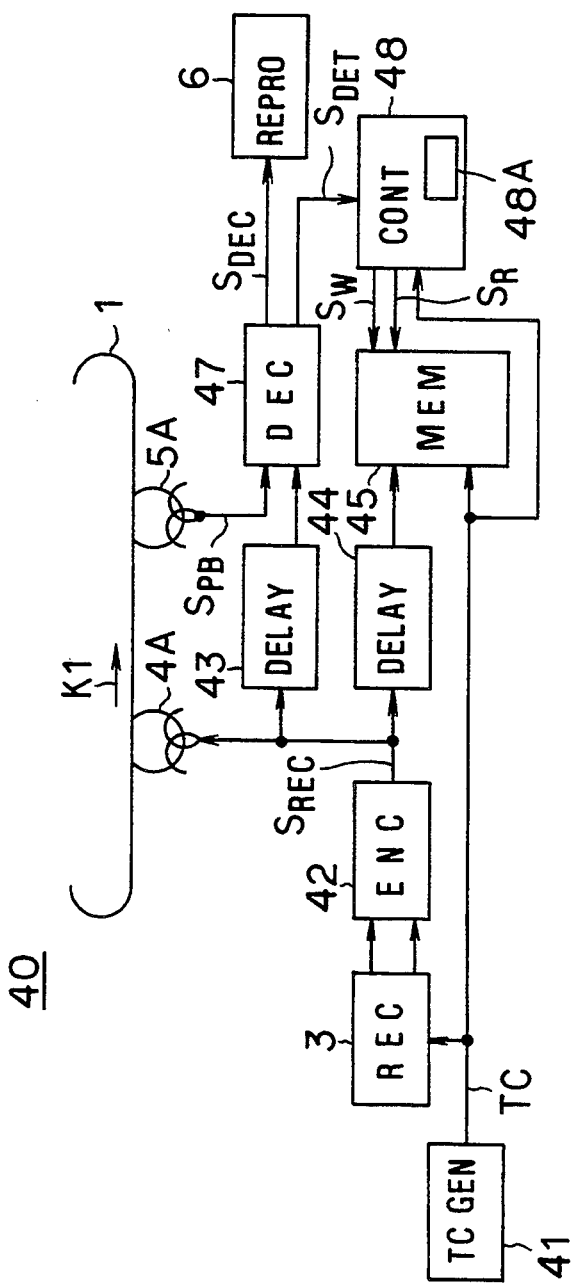
FIG. 12 is a block diagram illustrating a second embodiment of the video tape recorder in accordance with the invention.

Components corresponding to those in FIG. 7 are designated by the same reference characters in FIG. 12. In FIG. 12, during normal recording mode, a video tape recorder 40 inputs a time code TC which is sent from a time code generating circuit 41 to a recording circuit 3. The video tape recorder 40 thereby adds this time code TC to a recording signal $S_{REC}$ which is sent from the recording circuit 3 to an encoder 42 and which is composed of a digital image signal and a digital audio signal. After the recording signal $S_{REC}$ has been encoded by the encoder 42, it is recorded on a magnetic tape 1 which runs in the direction indicated by arrow K1. The recording signal $S_{REC}$ is sent to a decoder 47 via a delay circuit 43, and is also sent to a memory circuit 45, which may be composed of frame memory, via a delay circuit 44.

A reproducing signal $S_{PB}$ which has been read with the aid of a reproducing head 5A is compared by the decoder 47 with the recording signal $S_{REC}$ sent from the delay circuit 43.

In other words, the delay circuit 43 delays the recording signal $S_{REC}$ for an amount of time which corresponds to the speed at which the magnetic tape 1 runs and the space between the recording head 4A and the reproducing head 5A. Thus, the decoder 47 compares the reproducing signal $S_{PB}$ with the recording signal $S_{REC}$ to detect a recording error which may occur in the signal recorded on the magnetic tape 1. This reproducing signal $S_{PB}$ is obtained by reproducing, with the aid of the reproducing head 5A, the signal which has been recorded on the magnetic tape 1, whereas the recording signal $S_{REC}$ is input without recording it on the magnetic tape 1.

When the reproducing signal $S_{PB}$ agrees with the recording signal $S_{REC}$, it is determined that no recording error occurs. A demodulated signal $S_{DEC}$ obtained by demodulating the reproducing signal $S_{PB}$ is sent to a reproducing circuit 6.

On the other hand, when the reproducing signal $S_{PB}$ does not agree with the recording signal $S_{REC}$, it is determined that a recording error has occurred. A recording error detection signal $SDE_T$ indicating that such a recording error has occurred is sent to a control circuit 48 composed of a microcomputer.

The control circuit 48, when it receives such a recording error detection signal $S_{DET}$, inputs a time code TC at this moment from the time code generating circuit 41. The control circuit 48 calculates, based on this time code TC, a time code for the track on which the above recording error has occurred, and then stores this time code in an address memory 48A.

While at the same time, the control circuit 48 sends a writing signal $S_w$ to the memory circuit 45 so as to store the recording signal $S_{REC}$, which is sent from the delay circuit 43, in a first memory area of the memory circuit 45.

The delay circuit 44 sends the recording signal $S_{REC}$, equal to the amount of the recording signal for one track of the tracks on which the recording error has occurred, to the memory circuit 45 when the writing signal $S_w$, based on the recording error, is input from the control circuit 48 to the memory circuit 45.

Thus, data (including the time code TC) equal to the amount of data to be stored on one track on the magnetic tape 1 on which the recording error has occurred is stored in the memory circuit 45.

As has been described, during the normal recording mode, the recording signal $S_{REC}$ is sequentially and correctly stored, track-by-track for any memory errors which have occurred, in the memory areas of the memory circuit 45.

Figure 13:
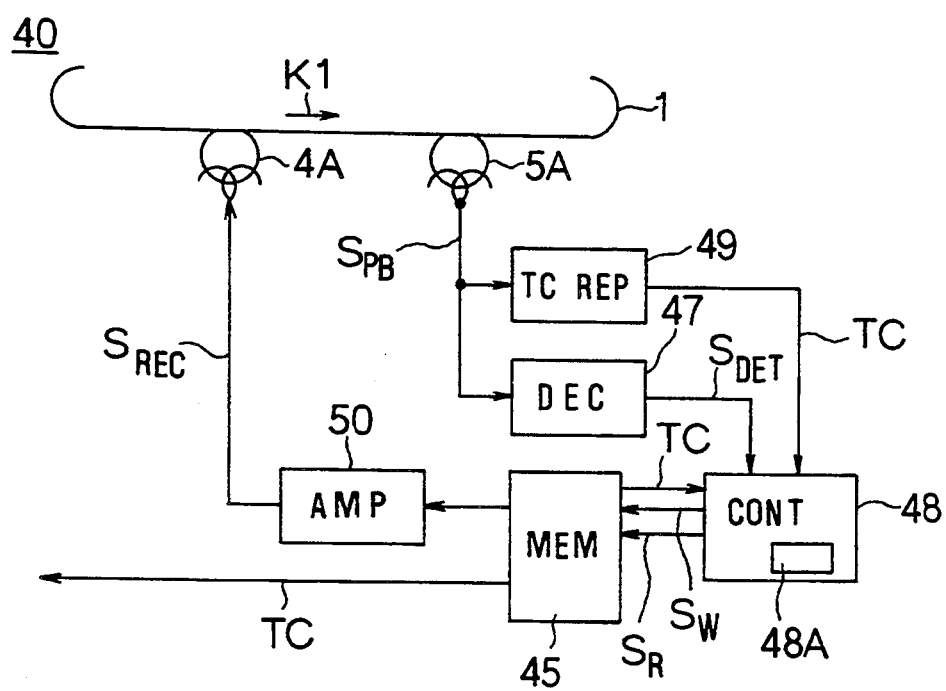
FIG. 13 is a block diagram showing a rerecording mode used in the second embodiment.

When the normal recording mode has been completed, the video tape recorder 40 rewinds the magnetic tape 1 before it is switched over to a rerecording mode so as to execute this rerecording mode. In the rerecording mode, as shown in FIG. 13, a system controller (not shown) is used for writing correct recording signal signals $S_{REC}$ on all the tracks on which recording errors have occurred.

In other words, in the rerecording mode, while the magnetic tape 1 is caused to run again in the direction indicated by arrow K1, the reproducing signal $S_{PB}$ is input with aid of the reproducing head 5A from the magnetic tape 1 to a time code reproducing circuit 49. The time code TC recorded on the magnetic tape 1 is thus sent to the control circuit 48 after it has been read.

Based on the time code TC which is input from the time code reproducing circuit 49, the control circuit 48 calculates a time code for a track which the record head 4A is about to scan.

If a time code which is stored in the address memory 48A and which is for tracks on which recording errors have occurred agrees with the time code which has been calculated, it is determined that the track which the recording head 4A is about to scan is the same track on which the recording error has occurred. A reading signal $S_R$ is thus sent to the memory circuit 45.

At this stage, the memory circuit 45, upon receiving the reading signal $S_R$, outputs the recording signal $S_{REC}$ that is equal to the amount of the recording signal $S_{REC}$ for one track stored in the first memory area (signal to be recorded on a track which the recording head 4A is to scan at this moment) so as to send it to the recording head 4A with the aid of a amplifying circuit 50. In the normal recording mode, by this sending of the recording signal $S_{REC}$, the recording signal $S_{REC}$ to be recorded is recorded once again on the track on which the recording error has occurred.

While at the same time, the time code TC of the recorded data which has been read from the memory circuit 45 is sent to the control circuit 48. The control circuit 48 thereby confirms whether or not the recording signal recorded by the recording head 4A at this time is a signal to be recorded on the track.

When the track which has been rerecorded is reproduced and scanned by the reproducing head 5A, a time code TC is reproduced which is included in a signal which has been rerecorded with the aid of the time code reproducing circuit 49. It is determined by decoder 47, whether or not a recording error has occured in a signal which is recorded on the rerecording track 47.

At this phase, when the time code TC is correctly reproduced and when no recording error is detected, the control circuit 48 determines that the recording signal $S_{REC}$ is correctly recorded on the rerecording track. The control circuit 48 thus deletes the time code for this track which is stored in the address memory 48A.

On the contrary, if the time code TC is not correctly reproduced and if a recording error detection signal $S_{DET}$ indicating that a recording error has occurred is input, the control circuit 48 determines that a recording error has again occurred on the track which has been rerecorded. The control circuit 48 then maintains the time code TC for this track stored in the address memory 48A, without deleting it.

Thus, in the normal recording mode, when the rerecording operation is completed in which signals to be recorded are sequentially recorded from the memory circuit 45 on tracks on which recording errors have occurred, time codes TC indicating that recording errors have occurred during the rerecording mode are left in the address memory 48A of the control circuit 48. Correct data to be recorded on these tracks is sequentially stored track-by-track in the memory areas of the memory circuit 45.

In such a case, the magnetic tape 1 is rewound to execute the rerecording mode, whereby the correct recording signal $S_{REC}$ is recorded on the track on which the recording error has occurred.

Thus, the recording signal $S_{REC}$ is recorded in a complementary manner on the track on which the recording error has occurred, thereby not leaving the recording error on the tracks.

Figure 5:
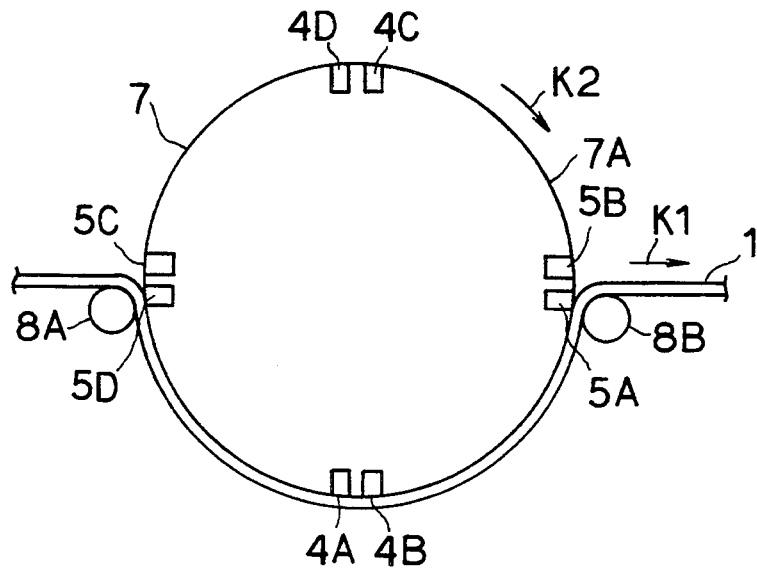
FIG. 5 is a schematic diagram showing the conventional rotary drum.

In this embodiment, in the video tape recorder 40, a rotary drum 7, having four recording/reproducing systems as described above with reference to FIG. 5, records the recording signal $S_{REC}$ on the magnetic tape 1. The video tape recorder 40 is provided with a total of four recording/reproducing systems which are all similar to those described above with reference to FIGS. 1 and 2.

The recording signal is sequentially recorded on tracks TR1, TR2 . . . by a first recording/reproducing system composed of the recording head 4A and the reproducing head 5A, a second recording/reproducing system composed of a recording head 4B and a reproducing head 5B, a third recording/reproducing system composed of a recording head 4C and a reproducing head 5C, and by a fourth recording/reproducing system composed of a recording head 4D and a reproducing head 5D.

The input terminals of the recording heads 4A (4B, 4C and 4D) are provided with switches which are used as means for switching the normal recording mode, mentioned with reference to FIG. 12, to the rerecording mode, described with reference to FIG. 13, and vice versa. The system controller (not shown) is used for switching these modes.

The video tape recorder 40 with the above construction stores all the time codes TC and data for the tracks on which recording errors have occurred after the normal recording mode is completed. The magnetic tape 1 is again rewound to execute the rerecording mode, whereby the recording signal $S_{REC}$ is once again recorded in a complementary manner on the tracks on which the recording errors have occurred.

Thus, when the rerecording mode is completed, the correct recording signal $S_{REC}$ equal to the amount of the recording signal for the track on which the recording error has occurred is recorded on this track.

The track on which the recorded data is missing due to a recording error is complemented by the correct recording signal $S_{REC}$.

When a time code TC remains in the address memory 48A of the control circuit 48 at the completion of the rerecording mode, this indicates that a recording error has again occurred on the track on which the data has been overwritten in this rerecording mode. In such a case, the video tape recorder 40 executes the rerecording mode again, thus recording the recording signal $S_{REC}$ once again on this track.

The rerecording mode is repeated so as to complement the recording error on the track of the magnetic tape 1 within a sufficient range for practical use. It is thus possible to prevent the deterioration of a reproduced image obtained by reproducing the recorded data.

According to the above construction, in the normal recording mode, the time code for the track on which the recording error has occurred and the data to be recorded on this track, are stored in the address memory 48A and the memory circuit 45, respectively. Thereafter, the magnetic tape 1 is rewound to run again, and the recording signal $S_{REC}$ based on the data stored in the memory circuit 45 is again recorded, when this corrupted track passes the recording head. The correct recording signal can thus be supplementarily overwritten on the track on which the recording error has occurred, thereby recording the recording signal $S_{REC}$ with certainty.

The recorded data can be reproduced without losing image quality.

Since the magnetic tape 1 is rewound to again record the recording signal on the track on which the recording error has occurred, a recording head for rerecording is not required. The recording signal can be rerecorded on the track on which the recording error has occurred, without making the entire structure complex.

Modifications of the Second Embodiment (5-1) In the above embodiment, data based on the recording signal $S_{REC}$ is stored track-by-track in the memory circuit 45, and a region on the magnetic tape in which a recording error has occurred is recorded track-by-track in a complementary manner. The present invention, however, is not limited to the above. For example, it may also be possible to use a data unit such that a region in which a recording error has occurred may also be stored sync-block-by-sync-block in a complementary fashion.

(5-2) In the above-described embodiment, though a digital image signal of one field is divided into six tracks for recording, the invention is not limited to six tracks. A digital image signal of one field may also be divided into any other numbers of tracks for recording.

(5-3) In the previously mentioned embodiment, the invention is applied to a digital VTR which has a rotary drum composed of four recording/reproducing systems. The invention is not limited to such a VTR, but may also be widely applied to VTRs which have a rotary drum composed of a plurality of heads, or to magnetic recording devices which have stationary heads.

(5-4) Though the invention is applied to a digital VTR in the embodiment mentioned above, it is not limited to such a digital VTR. The invention may also be widely applied to magnetic recording devices in which a recording signal is recorded on recording tracks of a magnetic tape, or to recording devices in which a recording signal is recorded on a recording medium such as a magneto-optic tape.

(6) Third Embodiment

Figure 14:
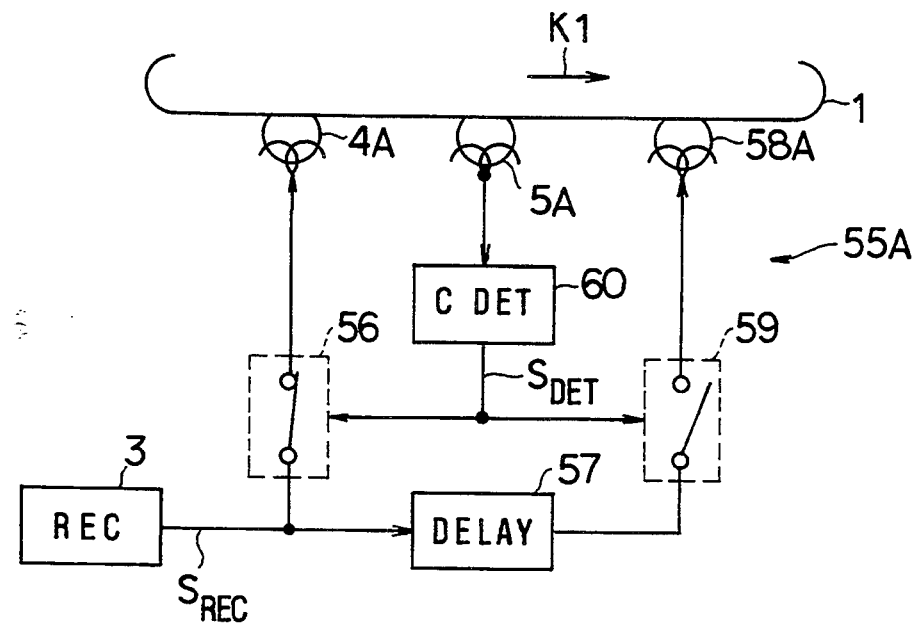
FIG. 14 is a block diagram showing a third embodiment of the video tape recorder according to this invention.

Components corresponding to those in FIG. 1 are designated by the same reference characters in FIG. 14. In FIG. 14, a first recording/reproducing system 55A of a video tape recorder 55 sends a recording signal $S_{REC}$ to a switching circuit 56 and a delay circuit 57. This recording signal $S_{REC}$ is sent from a recording circuit 3, and is composed of a digital image signal and a digital audio signal.

During normal recording mode, the switching circuit 56 is ON and sends the recording signal $S_{REC}$ to a main recording head 4A, thereby recording data, based on the recording signal $S_{REC}$, onto a magnetic tape 1 which runs in the direction indicated by arrow K1.

The delay circuit 57 delays track-by-track the recording signal $S_{REC}$ for only the amount of time which corresponds to the speed at which the magnetic tape 1 runs and the space between the main recording head 4A and a preliminary recording head 58A. When the preliminary recording head 58A scans a track which the main recording head 4A has recorded and scanned, the delay circuit 57 sends the recording signal $S_{REC}$ to a switching circuit 59, and then to preliminary recording head 58A.

Since the switching circuit 59 is OFF during the normal recording mode, the recording signal $S_{REC}$ is not sent to the preliminary recording head 58A during the normal recording mode.

Thus, during the normal recording mode, the main recording head 4A records the recording signal $S_{REC}$ onto the magnetic tape 1.

The data recorded by the main recording head 4A is input to a clog detecting circuit 60 via a reproducing head 5A for monitoring/reproducing.

The clog detecting circuit 60 detects data recorded by the main recording head 4A on tracks TR1, TR2 . . . in the form of a high-frequency signal (RF signal) so as to detect the envelope of the RF signal.

When the envelope is no longer detected, the clog detecting circuit 60 determines that a clog has occurred in which the main recording head 4A cannot record data onto the magnetic tape 1. The clog detecting circuit 60 then immediately sends a clog detecting signal $S_{DET}$ to the switching circuits 56 and 59, thereby turning the switching circuit 56 OFF and the switching circuit 59 ON.

Thus, the main recording head 4A is controlled to enter a record stop state by virtue of the fact that the recording signal $S_{REC}$ is not being input. The preliminary recording head 58A starts a recording operation of the recording signal $S_{REC}$ sent from the delay circuit 57 and passed by switching circuit 59 (which is now ON).

The preliminary recording head 58A records data from the delay circuit 57 in a region which lies next to the region that the preliminary recording head 58A is scanning at this moment.

Data assigned to this region in which the preliminary recording head 58A has started recording is recorded in a substantially successive manner, because data to be input to the preliminary recording head 58A is delayed by the delay circuit 57 for the amount of time mentioned above.

Thus, by the time a region in which a recording error has occurred comes to a position in which the preliminary recording head 58A scans this region, the preliminary recording head 58A has already been in the recording operation. The preliminary recording head 58A records the recording signal $S_{REC}$ in the recording error region, and then continues the recording operation thereafter.

Figure 15:
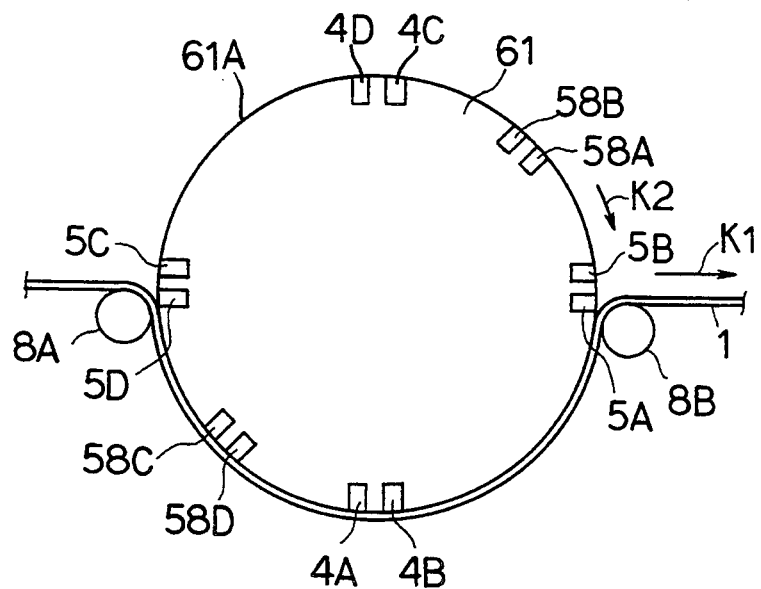
FIG. 15 is a plan view showing the structure of a rotary drum of the video tape recorder Shown in FIG. 14.

In this embodiment, a rotary drum 61 constructed as illustrated in FIG. 15 is used for a method of continuously recording the data. In this method, the main recording head 4A is switched over to the preliminary recording head 58A when it is detected, with the aid of the reproducing head 5A, that recorded data is missing due to factors such as a clog.

The magnetic tape 1 is helically wound by guide posts 8A and 8B around the periphery 61A of the rotary drum 61. It runs in the direction indicated by arrow K1, whereas the rotary drum 61 rotates in the direction indicated by arrow K2.

The rotary drum 61 is provided with a total of four recording/reproducing systems which are all similar to the first recording/reproducing system 55A. This first recording/reproducing system 55A is composed of the main recording head 4A, the reproducing head 5A and the preliminary recording head 58A which are all described with reference to FIG. 14.

In other words, the first recording/reproducing system 55A is constructed in the following manner. The main recording head 4A, for scanning the tack TR1 (see FIG. 2), is arranged on the periphery 61A of the rotary drum 61. The reproducing head 5A is also disposed on the periphery 61A of the rotary drum 61 in a direction opposite to the direction in which the rotary drum 61 rotates, 90° apart from the main recording head 4A. The reproducing head 5A is used for reproducing and scanning the track TR1 immediately after the main recording head 4A has scanned the same track TR1. The preliminary recording head 58A is also arranged on the periphery 61A of the rotary drum 61, apart from the reproducing head 5A by a predetermined angle in a direction opposite to that in which the rotary drum 61 rotates. The preliminary recording head 58A is used for scanning the track TR1 after the reproducing head 5A has scanned the track TR1.

Furthermore, a main recording head 4B, a reproducing head 5B, and a preliminary recording head 58B, all of which are used for sequentially scanning the track TR2 and serve as a second recording/reproducing system, are arranged apart from the main recording head 4A, the reproducing head 5A, and the preliminary head 58A, respectively, at a distance equal to only a track pitch TP.

A main recording head 4C, a reproducing head 5C, and a preliminary recording head 58C, all of which are used for sequentially scanning the track TR3 and serve as a third recording/reproducing system, are disposed 180° apart from the main recording head 4A, the reproducing head 5A, and the preliminary recording head 58A, respectively.

A main recording head 4D, a reproducing head 5D, and a preliminary recording head 58D, all of which are used for sequentially scanning the track TR4 and serve as a fourth recording/reproducing system, are arranged apart from the main recording head 4C, the reproducing head 5C, and the preliminary head 58C, respectively, at a distance equal to only the track pitch TP.

In this embodiment, in the same manner as in the first recording/reproducing system described previously with reference to FIG. 14, the second, third and fourth recording/reproducing systems record, with the aid of the preliminary recording heads 58B, 58C and 58D, the same data as the data which has been recorded, with the aid of the recording heads 4B, 4C and 4D, on the corresponding tracks.

Thus, even if the main recording heads 4B-4D are switched over to the preliminary recording heads 58B-58D while the data is being recording on the magnetic tape 1, it is possible for data assigned to the tracks TR2, TR3 ... to be correctly recorded on these tracks in a successive manner. Even if a clog or the like occurs on the main recording heads 4B-4D, the preliminary recording heads 58B-58D record the data instead of the main recording heads 4B-4D.

In the above construction, when a clog or the like occurs, for example, on the main recording head 4A of the first recording/reproducing system 55A, with the result that the recording signal $S_{REC}$ is not recorded on the track TR1, which the main recording head 4A is now recording and scanning, the clog detecting circuit 60 detects this with the aid of the reproducing head 5A. The clog detecting circuit 60 then immediately turns the switching circuit 56 OFF, and at the same time turns the switching circuit 59 ON. The recording operation is thus switched over from recording head 4A to the preliminary recording head 58 for maintaining the recording operation.

At this stage, because the preliminary recording head 58A is arranged downstream of the reproducing head 5A in direction K1 in which the magnetic tape 1 runs, by the time the preliminary recording head 58A scans the region of the track TR1 on which a recording error has occurred, the main recording head 4A has already been switched over to the preliminary recording head 58A for the recording operation. The recording signal $S_{REC}$ is thus rerecorded with certainty in the region in which the recording error has occurred.

The preliminary recording head 58A instead of the main recording head 4A records the data on the track on which the main recording head 4A first intended to record and scan.

By the time the reproducing head 5A reproduces and scans the region in which the recording error has occurred, so as to switch the main recording head 4A to the preliminary recording head 58A, the recorded data has already been recorded by the recording head 4A between the reproducing head 5A and the preliminary head 58A. The preliminary head 58A thus overwrites the recorded data.

A boundary may be formed in the region in which the overwriting has been started, between a region which has been recorded by the recording head 4A and a region which has been overwritten by the preliminary head 58A. As a result, the data may not be generated in a continuous fashion. In such a case, an error correction means such as dropout compensation is utilized during reproduction to correct only this recorded data in a sync block in which the boundary has been formed. It is thus possible to prevent a reproduced image from deteriorating within a sufficient range for practical use.

The recorded data is thus continuously recorded on the magnetic tape 1 within a sufficient range for practical use.

In the same manner as in the second, third and fourth recording/reproducing systems, if a clog or the like occurs on the main recording heads 4B, 4C and 4D, the corresponding preliminary recording heads 58B, 58C and 58D record the data in place of the main recording heads 4B, 4C and 4D. It is thus possible to prevent the recorded data from being corrupted which may deteriorate the reproduced image.

In accordance with the construction mentioned above, if a clog or the like occurs on the main recording heads 4A-4D preventing these recording heads 4A-4D from recording the recording signal $S_{REC}$, the preliminary recording heads 58A-58D, respectively corresponding to the main recording heads 4A-4D, are caused to record the data instead of the main recording heads 4A-4D. The recording signal $S_{REC}$ can thus be recorded with certainty.

(7) Modification of the Third Embodiment

Figure 16:
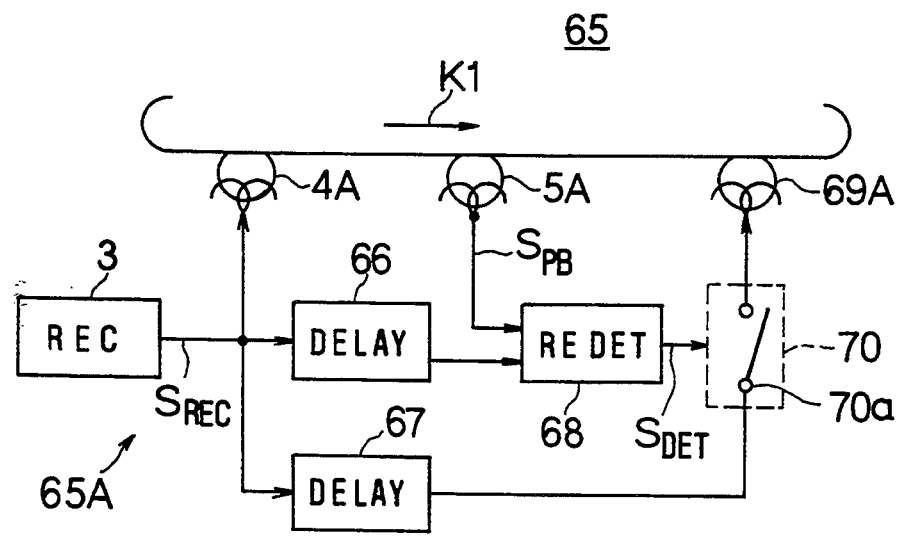
FIG. 16 is a block diagram showing a modification of the third embodiment.

Components corresponding to those in FIG. 1 are indicated by the same reference characters in FIG. 16. In a first recording/reproducing system 65A of a video tape recorder 65 shown in FIG. 16, a recording signal $S_{REC}$ is input from a recording circuit 3 to a main recording head 4A so as to record the recording signal $S_{REC}$ on a magnetic tape 1 which runs in the direction indicated by arrow K1. The recording signal $S_{REC}$ is also input to delay circuits 66 and 67.

The delay circuit 66 delays the recording signal $SRE_C$ for the amount of time which corresponds to the speed at which the magnetic tape 1 runs and the space between the main recording head 4A and a reproducing head 5A. The delay circuit 66 then sends the recording signal $S_{REC}$ to a recording error detecting circuit 68.

The recording error detecting circuit 68 compares a reproducing signal $S_{PB}$, which is input with the aid of the reproducing head 5A, with the recording signal $S_{REC}$, which is input from the delay circuit 66.

In other words, the reproducing head 5A reproduces and scans a track TR1 (see FIG. 2) on which the recording signal $S_{REC}$ has been recorded with the aid of the main recording head 4A after the track TR1 has been scanned by the main recording head 4A. The recording signal $S_{REC}$ recorded on the track TR1 is input through the delay circuit 66 to the recording error detecting circuit 68 when the reproducing signal $S_{PB}$ is input to the recording error detecting circuit 68. The recording signal $S_{REC}$ is thus compared with the reproducing signal $S_{PB}$ so as to determine whether or not the recording signal $S_{REC}$ is correctly recorded on the track TR1.

At this phase, when the reproducing signal $S_{PB}$ does not agree with the recording signal $S_{REC}$, the recording error detecting circuit 68 determines that the recording signal $S_{REC}$ has not been correctly recorded on the magnetic tape 1 (an recording error has occurred). The recording error detecting circuit 68 then sends an error detecting signal $S_{DET}$ to a switching circuit 70 at such a time that a preliminary recording head 69A starts scanning the track on which the recording error has occurred.

The switching circuit 70 is constructed in such a way that it is OFF under normal conditions, and is turned ON only when the error detecting signal $S_{DET}$ is input thereto.

Thus, the switching circuit 70 is turned ON when the preliminary recording head 69A starts scanning the track on which the recording error has occurred, thereby sending the recording signal $S_{REC}$, which is input with the aid of the delay circuit 67, to the preliminary recording head 69A.

In this embodiment, the delay circuit 67 is designed to delay the recording signal $S_{REC}$ for the amount of time which corresponds to the speed at which the magnetic tape 1 runs and the space between the main recording head 4A and the preliminary recording head 69A.

Thus, the recording signal $S_{REC}$, which is input via the delay circuit 67 to the preliminary recording head 69A, is a recording signal which is assigned to a track to be scanned by the preliminary recording head 69A. For this reason, the recording signal $S_{REC}$ is once again recorded on to the track on which the recording signal $S_{REC}$ has not been correctly recorded because the recording error has occurred at the main recording head 4A.

In the recording error detecting circuit 68, when the reproducing signal $S_{PB}$ agrees with the recording signal $S_{REC}$ after the above operation, the recording error detecting circuit 68 determines that the main recording head 4A has resumed the recording operation correctly while the reproducing head 5A is scanning. After the preliminary recording head 69A stops scanning the track, the recording error detecting circuit 68 stops sending the recording error detecting signal $S_{DET}$.

When a second track which has been recorded correctly comes to a scanning position in which the preliminary recording head 69A scans the track, the recording signal is no longer input from the delay circuit 67 to the preliminary recording head 69A. Therefore, the recording signal is supplementarily recorded on only the track of the magnetic tape 1 in which the recording error has occurred.

Figure 17:
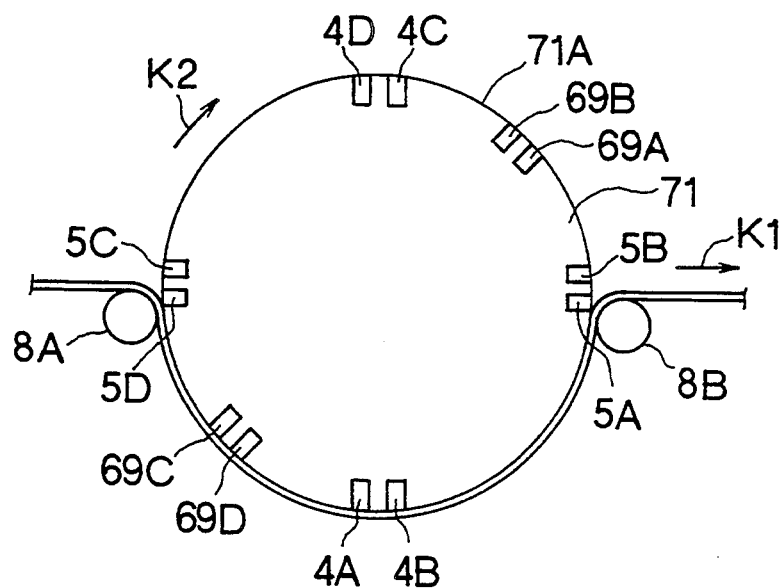
FIG. 17 is a plan view illustrating the structure of a rotary drum of the video tape recorder shown in FIG. 16.

In this modification, a rotary drum 71 as constructed in FIG. 17 is used for recording the recording signal $SRE_C$ on the magnetic tape 1.

In other words, the magnetic tape 1 which runs in the direction indicated by arrow K1 is wound by guide posts 8A and 8B around the periphery 71A of the rotary drum 71. This rotary drum 71 rotates in the direction indicated by arrow K2.

The rotary drum 71 has a total of four recording/reproducing systems which are all similar to the first recording/reproducing system. The first recording/reproducing system is made up of the main recording head 4A, the reproducing head 5A, and the preliminary recording head 69A, all of which have been described with reference to FIG. 16.

More specifically, the first recording/reproducing system 65A (see FIG. 16) is constructed in the following way. The main recording head 4A, for scanning the tack TR1 (see FIG. 2), is arranged on the periphery 71A of the rotary drum 71. The reproducing head 5A is disposed on the periphery 71A of the rotary drum 71 in a direction opposite to the direction in which the rotary drum 71 rotates, 90° apart from the main recording head 4A. The preliminary recording head 69A is arranged on the periphery 71A of the rotary drum 71, apart from the reproducing head 5A by a predetermined angle in a direction opposite to that in which the rotary drum 71 rotates. The reproducing head 5A and the preliminary recording head 69A are used for sequentially scanning the track TR1 after the main recording head 4A has scanned the same track TR1.

Furthermore, a main recording head 4B for scanning a track TR2 is arranged apart from the main recording head 4A at a distance equal to only a track pitch TP. A reproducing head 5B is also disposed in the direction opposite to that in which the rotary drum 71 rotates, 90° apart from the main recording head 4B. A preliminary recording head 69B is also arranged apart from the reproducing head 5B by a predetermined angle in the direction opposite to that in which the rotary drum 71 rotates. The main recording head 4B, reproducing head 5B, and the preliminary recording head 69B constitute a second recording/reproducing system. The reproducing head 5B and the preliminary recording head 69B sequentially scan the track TR2 after the main recording head 4B has scanned the track TR2.

The data is sequentially recorded based on the recording signal $S_{REC}$ On the track TR2 by the same recording operation as by the first recording/reproducing system 65A, which has been explained with reference to FIG. 16.

Moreover, a main recording head 4C for scanning a track TR3 is arranged 180° apart from the main recording head 4A. A reproducing head 5C is also disposed in the direction opposite to that in which the rotary drum 71 rotates, 90° apart from the main recording head 4C. A preliminary recording head 69C is also arranged apart from the reproducing head 5C by a predetermined angle in the direction opposite to that in which the rotary drum 71 rotates. The above main recording head 4C, reproducing head 5C, and the preliminary recording head 69C constitute a third recording/reproducing system. The reproducing head 5C and the preliminary recording head 69C sequentially scan the track TR3 after the main recording head 4C has scanned the track TR3.

The data is sequentially recorded based on the recording signal $S_{REC}$ on the track TR3 by the same recording operation as by the first recording/reproducing system 65A which has been explained with reference to FIG. 16.

Moreover, a main recording head 4D for scanning a track TR3 is arranged 180° apart from the main recording head 4B of the second recording/reproducing system. A reproducing head 5D is also disposed in the direction opposite to that in which the rotary drum 71 rotates, 90° apart from the main recording head 4D. A preliminary recording head 69D is also arranged apart from the reproducing head 5D by a predetermined angle in the direction opposite to that in which the rotary drum 71 rotates. The main recording head 4D, the reproducing head 5D, and the preliminary recording head 69D constitute a forth recording/reproducing system. The reproducing head 5D and the preliminary recording head 69D sequentially scan the track TR4 after the main recording head 4D has scanned the track TR4.

The main recording head 4D, the reproducing head 5D, and the preliminary recording head 69D record the data on the track TR4 based on the recording signal $S_{REC}$. This recording is made by the same recording operation as the recording operation performed by the first recording/reproducing system, which has been described with reference to FIG. 16.

In the above construction, the main recording heads 4A-4D of the first to fourth recording/reproducing systems record the data on the tracks TR1, TR2 ... of the magnetic tape 1. The reproducing heads 5A-5D detect whether or not the data is correctly recorded on the respective tracks TR1, TR2 ....

If recording errors occur on tracks, then the preliminary recording heads 69A-69D supplementarily record the data track-by-track on the tracks on which the recording errors have occurred.

Thus, on all the tracks a boundary is not formed between a region which is recorded by the main recording head and a region which is recorded by the preliminary recording head.

Even if the preliminary recording heads 69A-69D record the data in a complementary fashion every time a recording error occurs, because the recorded data is generated continuously on all the tracks, the data is recorded in a continuous form with certainty.

The above construction permits the reproducing heads to detect whether or not a recording error occurs in the data recorded on a track. If the recording error has occurred, the preliminary recording head supplementarily records the data to be recorded in a region including the region in which the recording error has occurred. The data based on the recording signal $S_{REC}$ can thus be recorded on the magnetic tape 1 with certainty.

(8) Other Modifications of the Third Embodiment (8-1) In the above embodiment, although data is complemented track-by-track, the present invention is not limited to such a complement. For example, data may also be complemented by other data units such as a sync block unit.

(8-2) In the above-mentioned embodiment, though a digital image signal and a digital audio signal of one field are divided into six tracks for recording, the present invention is not limited to such recording. For example, a digital image signal and a digital audio signal of one field may also be recorded on a single track or a plurality of tracks.

(8-3) A recording error is detected only once, and the data is rewritten only once in the embodiment mentioned above. However, the frequency of detecting a recording error and of rewriting the data is not limited to once. A recording error may also be detected a plurality of times, and the data may also be rewritten a plurality of times.

(8-4) In the previously mentioned embodiment, the invention is applied to a digital VTR which has a rotary drum composed of four recording/reproducing systems. The invention is not limited to such a VTR, but may also be applied to VTRs which have a rotary drum composed of a plurality of heads, or to magnetic recording devices which have stationary heads.

(8-5) Though the invention is applied to a digital VTR in the previously mentioned embodiment, it is not limited to such a digital VTR. The invention may also be widely applied to magnetic recording devices in which a recording signal is recorded on recording tracks of a magnetic tape, or to recording devices in which a recording signal is recorded on a recording medium such as a magneto-optic tape.

What is claimed is:

1. A video tape apparatus for recording video signals on recording tracks formed diagonally one after the other on a magnetic tape to be scanned in a predetermined direction and for reproducing video signals from the magnetic tape, said apparatus comprising:

recording means including first and second recording heads for recording a video signal, said first recording head being arranged to follow said second head in a direction of tape travel wherein after one of said first and second recording heads underwrites and records a portion of said video signal on predetermined recording tracks of said recording medium, the other of said first and second recording heads superimposes and rerecords the same portion of said video signal on the same predetermined recording tracks, wherein said first recording head serves both as a recording head and as a reproducing head, and wherein during an overwriting and recording mode means are provided for moving said first recording head to a position before said second recording head in the direction of tape travel, thereby recording and scanning said recording tracks which are to be later recorded and scanned by said second recording head.

2. The apparatus of claim 1, further comprising delay means connected to receive said video signal to be recorded for producing a delayed video signal, and switch means having a first input connected to said video signal to be recorded, a second input connected to said delayed video signal, and an output connected to said second recording head, wherein said switch means connects said delayed video signal to said second recording head when said first recording head is moved to said position before said second recording head in the direction of tape travel.

* * * * *